US012612766B2

(12) United States Patent
Fukuo et al.

(10) Patent No.: US 12,612,766 B2
(45) Date of Patent: Apr. 28, 2026

(54) MANAGEMENT SYSTEM

(71) Applicant: KOBELCO CONSTRUCTION MACHINERY CO., LTD., Hiroshima (JP)

(72) Inventors: Nobuhiro Fukuo, Hiroshima (JP); Takayuki Doi, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 58 days.

(21) Appl. No.: 18/706,058

(22) PCT Filed: Oct. 14, 2022

(86) PCT No.: PCT/JP2022/038468
§ 371 (c)(1),
(2) Date: Apr. 30, 2024

(87) PCT Pub. No.: WO2023/084996
PCT Pub. Date: May 19, 2023

(65) Prior Publication Data
US 2025/0003196 A1     Jan. 2, 2025

(30) Foreign Application Priority Data

Nov. 9, 2021     (JP) ................................. 2021-182704
Feb. 18, 2022    (JP) ................................. 2022-023407

(51) Int. Cl.
*E02F 9/20*          (2006.01)
*E02F 9/26*          (2006.01)
(Continued)

(52) U.S. Cl.
CPC ............ *E02F 9/261* (2013.01); *E02F 9/2054* (2013.01); *E02F 9/264* (2013.01); *E02F 9/267* (2013.01);
(Continued)

(58) Field of Classification Search
None
See application file for complete search history.

(56) References Cited

U.S. PATENT DOCUMENTS 4,604,006 A * 8/1986 Shoji ..................... B23Q 11/04
                                                        408/11
2006/0224279 A1* 10/2006 Mori ................... F02N 11/0833
                                                        701/1
(Continued)

FOREIGN PATENT DOCUMENTS

JP        2013-235485 A     11/2013
JP        2016-78649 A      5/2016
(Continued)

OTHER PUBLICATIONS

International Search Report mailed on Dec. 13, 2022 in PCT/JP2022/038468 filed on Oct. 14, 2022, 2 pages).
(Continued)

*Primary Examiner* — Daniel L Greene
*Assistant Examiner* — Robert L Pinkerton
(74) *Attorney, Agent, or Firm* — Oblon, McClelland, Maier & Neustadt, L.L.P.

(57) ABSTRACT

A management system is provided that is capable of grasping a motion situation of each of a plurality of work machines. The management system includes: a reception device that receives information regarding a motion situation of each of a plurality of work machines; a display device that displays an image according to a command signal to be input; and a display control unit that inputs, to the display device, the command signal corresponding to the motion situation of each of the plurality of work machines based on the information received by the reception device.

9 Claims, 6 Drawing Sheets

(51) Int. Cl.
    *G06T 11/60*         (2006.01)
    *H04N 7/18*         (2006.01)
    *G07C 5/02*         (2006.01)

(52) U.S. Cl.
    CPC ............. *G06T 11/60* (2013.01); *H04N 7/183*
        (2013.01); *E02F 9/205* (2013.01); *G07C 5/02*
                      (2013.01)

(56)         References Cited

U.S. PATENT DOCUMENTS

| | | | |
|---|---|---|---|
| 2010/0091103 A1 | 4/2010 | Peltonen et al. | |
| 2012/0232763 A1 | 9/2012 | Mizuochi et al. | |
| 2017/0263214 A1 | 9/2017 | Zaizen et al. | |
| 2017/0328030 A1 | 11/2017 | Yamada et al. | |
| 2020/0173791 A1 | 6/2020 | Misaki | |
| 2021/0403037 A1* | 12/2021 | Horigome | ............. B60W 40/08 |

| | | | |
|---|---|---|---|
| 2022/0106769 A1* | 4/2022 | Takaoka | .................. E02F 3/841 |
| 2022/0274526 A1* | 9/2022 | Yamashita | ............. H04N 23/56 |
| 2024/0044112 A1* | 2/2024 | Murakami | .............. E02F 9/267 |
| 2024/0229418 A9* | 7/2024 | Yamamoto | ............. E02F 9/265 |
| 2024/0318409 A1* | 9/2024 | Fujiwara | ................. E02F 9/267 |

FOREIGN PATENT DOCUMENTS

| | | |
|---|---|---|
| JP | 2019-19567 A | 2/2019 |
| WO | WO 2005/043433 A1 | 5/2005 |
| WO | WO 2011/049079 A1 | 4/2011 |
| WO | WO 2016/121010 A1 | 8/2016 |
| WO | WO 2020/175645 A1 | 9/2020 |

OTHER PUBLICATIONS

Extended European Search Report issued Jan. 17, 2025, in corresponding European Patent Application No. 22892496.5, 9 pages.

* cited by examiner

FIG.1

MANAGEMENT SYSTEM

CROSS-REFERENCES TO RELATED APPLICATIONS

This application is a National Stage of International Application No. PCT/JP2022/038468, filed Oct. 14, 2022, the entire contents of which are incorporated herein by reference.

TECHNICAL FIELD

The present invention relates to a management system that manages a plurality of work machines.

BACKGROUND ART

Patent Literature 1 discloses a management system of industrial vehicles that displays a map image on a display device. In the map image, symbols indicating the positions of a plurality of industrial vehicles are superimposed and displayed. A display aspect of the symbol is set to be different according to operating time of the industrial vehicle.

CITATION LIST

Patent Literature

Patent Literature 1: Japanese Patent Application Laid-Open No. 2013-235485

With the management system of Patent Literature 1, the position and the operating time of each of the plurality of work machines are known, but the motion situation of each of the plurality of work machines cannot be grasped.

SUMMARY OF INVENTION

An object of the present invention is to provide a management system that makes it possible to grasp a motion situation of each of a plurality of work machines.

The present invention provides a management system. The management system includes a reception device that receives information regarding a motion situation of each of a plurality of work machines, a display device that displays an image according to a command signal to be input, and a display control unit that inputs, to the display device, the command signal corresponding to the motion situation of each of the plurality of work machines based on the information received by the reception device.

BRIEF DESCRIPTION OF DRAWINGS

FIG. 1 is a view illustrating a management system according to one embodiment of the present invention.

DESCRIPTION OF EMBODIMENTS

Hereinafter, a preferred embodiment of the present invention will be described with reference to the drawings.
(Configuration of Management System)

Figure 1:
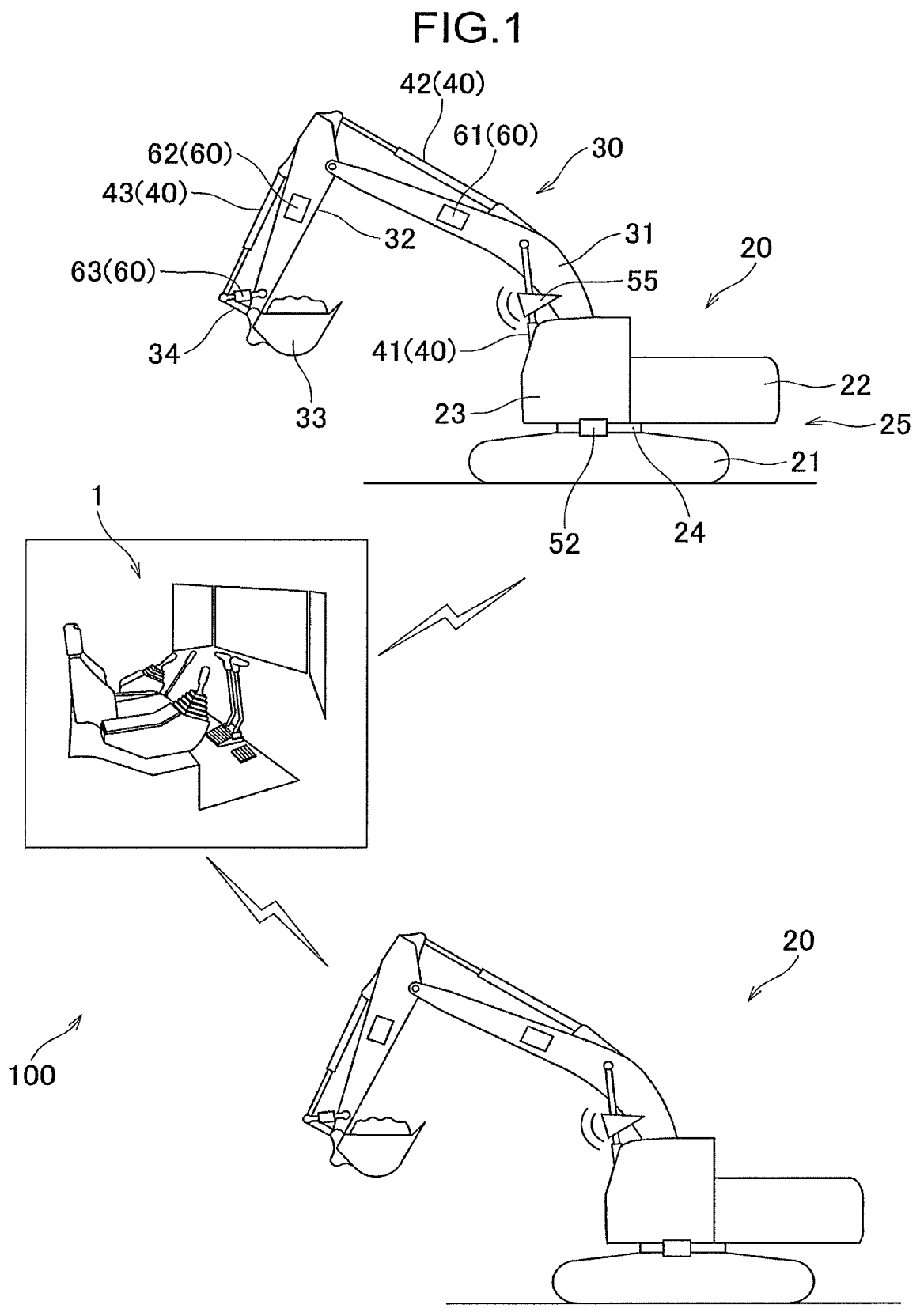

FIG. 1 is a view illustrating a management system 100 according to the present embodiment. As illustrated in FIG. 1, the management system 100 is a system for managing a plurality of work machines 20. The management system 100 includes the plurality of work machines 20 and a management room 1. The management room 1 is a cockpit, for example. An operator in the management room 1 remotely teaches motion to each of the several work machines 20. The teaching is also called direct teaching, is a teaching method in which an operator operates an operation device described later to teach motion, and is also called a direct instruction method. Then, the operator can remotely control the other work machine 20 while the work machine 20 having been taught is performing automatic drive.

Figure 2:
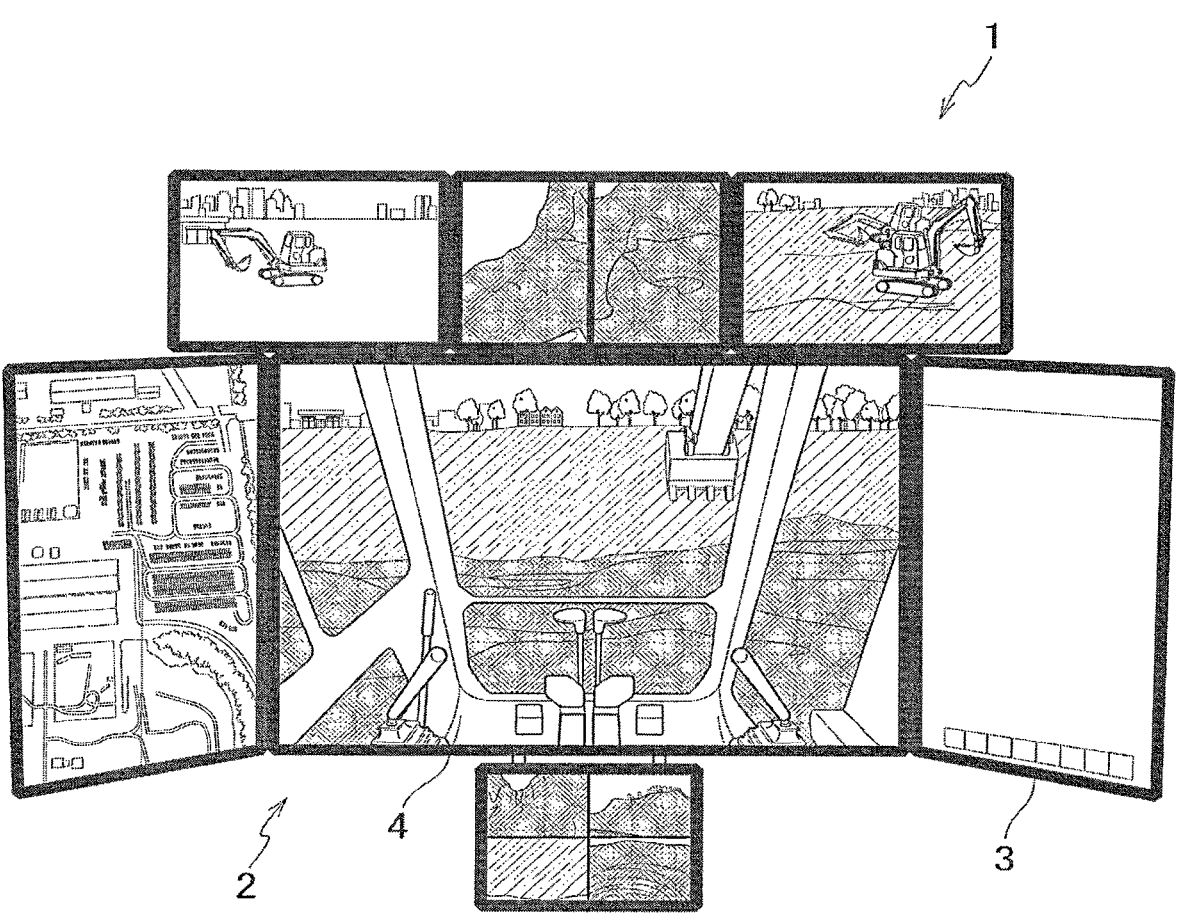
FIG. 2 is a view illustrating a display group of the management system according to the embodiment of the present invention.

The management room t includes a display group 2. FIG. 2 is a view illustrating the display group 2 of the management system 100. The display group 2 includes a plurality of displays, and these displays include a display device 3 and a remote control display device 4. These display devices display images corresponding to command signals to be input.
(Configuration of Work Machine)

As illustrated in FIG. 1, the work machine 20 is a hydraulic excavator, and the work machine 20 includes a machine body 25 including a lower travelling body 21 and an upper slewing body 22, an attachment 30, and a work drive device 40.

The lower travelling body 21 includes a pair of crawlers, and can travel on the ground by the pair of crawlers moving. The upper slewing body 22 is slewably attached to the lower travelling body 21 via a slewing device 24. The stewing device 24 is a slewing drive device that slews the upper slewing body 22. The upper slewing body 22 includes a cab (operator's room) 23 positioned at a front part thereof.

The attachment 30 is a work device and is attached to the upper slewing body 22 so as to be able to perform work motion including vertical rotation. The attachment 30 includes a boom 31, an arm 32, and a bucket 33. The boom 31 has a base end part attached to the upper stewing body 22 so as to be vertically rotatable (capable of being raised and lowered) and a tip end part on the opposite side. The arm 32 has a base end part attached to the tip end part of the boom 31 so as to be vertically rotatable with respect to the boom 31, and a tip end part on the opposite side. The bucket 33 is attached to the tip end part of the arm 32 so as to be rotatable in the front-rear direction with respect to the arm 32. The bucket 33 is a tip end attachment that is a tip end part of the attachment 30, and is a part that performs work such as excavation, leveling, and scooping of soil. Note that the work target object held by the bucket 33 is not limited to soil, may be stones, and may be waste (industrial waste or the like). The tip end attachment is not limited to the bucket 33, and may be a grapple, a lifting magnet, or the like.

The work drive device 40 hydraulically moves the attachment 30 to causes the work motion to be performed. In the present embodiment, the work drive device 40 includes a plurality of hydraulic cylinders each of which is extendable and contractable, and the plurality of cylinders include a boom cylinder 41, an arm cylinder 42, and a bucket cylinder 43.

The boom cylinder 41 rotates the boom 31 with respect to the upper slewing body 22. The boom cylinder 41 has a base end part rotatably coupled to the upper slewing body 22 and a tip end part rotatably coupled to the boom 31.

The arm cylinder 42 rotates the arm 32 with respect to boom 31. The arm cylinder 42 has a base end part rotatably coupled to the boom 31 and a tip end part rotatably coupled to the arm 32.

The bucket cylinder 43 rotates the bucket 33 with respect to the arm 32. The bucket cylinder 43 has a base end part rotatably coupled to the arm 32 and a tip end part rotatably coupled to a link member 34. The link member 34 is rotatably coupled to the bucket 33, and couples the bucket cylinder 43 and the bucket 33 to each other.

The work machine 20 further includes a slewing angle sensor 52, which is a slewing angle detector, and a work posture detector 60.

The slewing angle sensor 52 detects a slewing angle of the upper stewing body 22 with respect to the lower travelling body 21. The slewing angle sensor 52 is, for example, an encoder, a resolver, or a gyro sensor. In the present embodiment, the slewing angle of the upper stewing body 22 when the front of the upper slewing body 22 coincides with the front of the lower travelling body 21 is 0°.

The work posture detector 60 detects a work posture of the attachment 30. The work posture detector 60 includes a boom inclination angle sensor 61, an arm inclination angle sensor 62, and a bucket inclination angle sensor 63.

The boom inclination angle sensor 61 is attached to the boom 31 and detects a posture of the boom 31. The boom inclination angle sensor 61 acquires an inclination angle of the boom 31 with respect to a horizon. The boom inclination angle sensor 61 is an inclination (acceleration) sensor, for example. Note that the work posture detector 60 may include, in place of the boom inclination angle sensor 61, a rotation angle sensor that detects a rotation angle of a boom foot pin (boom base end) or a stroke sensor that detects a stroke amount of the boom cylinder 41.

The arm inclination angle sensor 62 is attached to the arm 32 and detects the posture of the arm 32. The arm inclination angle sensor 62 acquires an inclination angle of the arm 32 with respect to a horizon. The arm inclination angle sensor 62 is an inclination (acceleration) sensor, for example. Note that the work posture detector 60 may include, in place of the arm inclination angle sensor 62, a rotation angle sensor that detects a rotation angle of an arm coupling pin (arm base end) or a stroke sensor that detects a stroke amount of the arm cylinder 42.

The bucket inclination angle sensor 63 is attached to the link member 34 and detects the posture of the bucket 33. The bucket inclination angle sensor 63 acquires an inclination angle of the bucket 33 with respect to a horizon. The bucket inclination angle sensor 63 is an inclination (acceleration) sensor, for example. Note that the work posture detector 60 may include, in place of the bucket inclination angle sensor 63, a rotation angle sensor that detects a rotation angle of a bucket coupling pin (bucket base end) or a stroke sensor that detects a stroke amount of the bucket cylinder 43.

The work machine 20 includes a camera (image capturing device) 55. In the present embodiment, the camera 55 is attached to the boom 31. Note that the camera 55 may be attached to the upper slewing body 22. The camera 55 captures an image of the front or the like of the upper slewing body 22 from the same viewpoint as or a viewpoint close to the operator positioned in the cab 23.

(Configuration of Management System)

Figure 3:
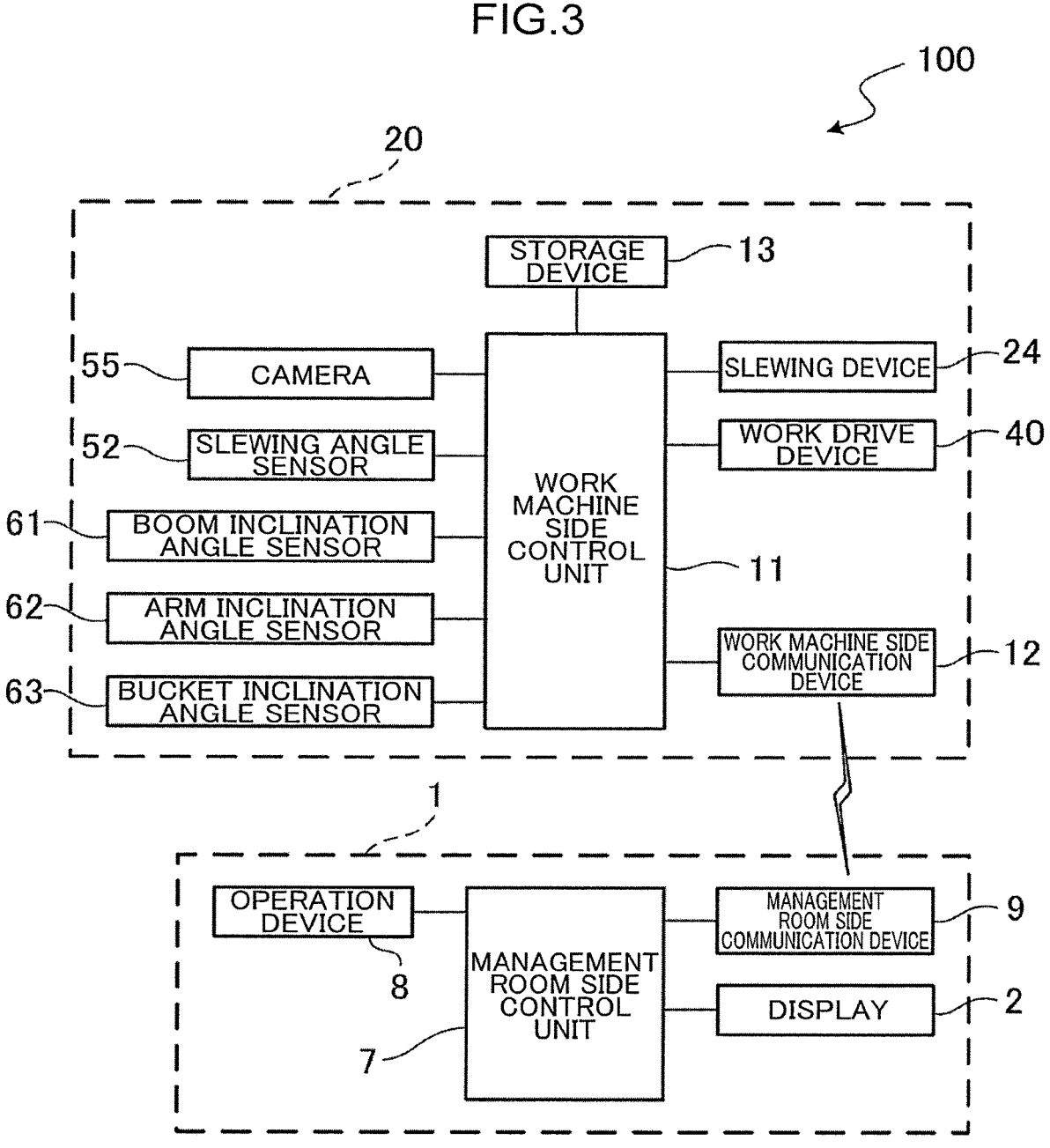
FIG. 3 is a block diagram of the management system according to the embodiment of the present invention.

FIG. 3 is a block diagram of the management system 100. As illustrated in FIG. 3, the work machine 20 includes a work machine side control unit 11, a work machine side communication device 12, and a storage device 13.

Information regarding the slewing angle (posture) of the upper slewing body 22 with respect to the lower travelling body 21 detected by the slewing angle sensor 52 is input to the work machine side control unit 11. Information regarding the posture of the boom 31 detected by the boom inclination angle sensor 61 is input to the work machine side control unit 11. Information regarding the posture of the arm 32 detected by the arm inclination angle sensor 62 is input to the work machine side control unit 11. Information regarding the posture of the bucket 33 detected by the bucket inclination angle sensor 63 is input to the work machine side control unit 11.

Image data captured by the camera 55 is input to the work machine side control unit 11.

When the work machine 20 is automatically driven, the work machine side control unit 11 automatically controls the work machine 20. The work machine side control unit 11 controls the upper slewing body 22 and the attachment 30 so that the upper slewing body 22 and the attachment 30 perform a series of motions. The work machine side control unit 11 automatically moves the slewing device 24 and the attachment 30 based on detection values of the slewing angle sensor 52 and the work posture detector 60. In the present embodiment, the series of motions is a motion of excavating soil and removing the soil.

On the other hand, when the work machine 20 is remotely controlled, the work machine side control unit 11 controls the movement of each of the upper slewing body 22 and the attachment 30 in accordance with an instruction from the management room 1.

The work machine side communication device 12 can communicate with a management room side communication device 9 described later of the management room 1. The storage device 13 stores work content remotely taught from the management room 1. Specifically, the storage device 13 stores a target trajectory of the tip end of the bucket 33. The target trajectory of the tip end of the bucket 33 will be described later.

The management room 1 includes a management room side control unit 7, an operation device 8, and the management room side communication device 9.

The operation device 8 includes a device necessary for remotely operating the work machine 20 such as an operation lever and an operation button. The operation device 8 receives an input of an operation for remotely controlling the work machine 20. Note that the operator remotely operates at least one work machine 20 of the plurality of work machines 20 using the operation device 8. The management room side communication device 9 can communicate with the work machine side communication device 12 of the work machine 20.

When teaching is performed from the management room 1, the work machine 20 is set to a teaching mode by a remote operation from the management room 1. When the work machine 20 is set to the teaching mode, the operator remotely controls the work machine 20 by operating the operation device 8. When the work machine 20 is remotely controlled, a landscape captured by the camera 55 is displayed on the display group 2. The operation content by the remote control is stored in the storage device 13. Thereafter, the work machine 20 is set to an automatic drive mode by a remote operation from the management room 1. When the work machine 20 is set to the automatic drive mode, the work machine 20 performs automatic drive in accordance with a movement taught in advance.

Here, the management room side control unit (target trajectory setting unit) 7 sets the target trajectory of the tip end of the bucket 33 by teaching. During automatic drive, a series of motions is performed by moving the upper slewing body 22 and the attachment 30 such that the tip end of the bucket 33 draws a preset target trajectory. Note that in the present embodiment, the target trajectory is set with the tip end of the bucket 33 as a specific site of the attachment 30, but the specific site of the attachment 30 is not limited to the tip end of the bucket 33.

In the present embodiment, a series of motions performed by the work machine 20 is to repeat motions such as excavating (excavate) soil from a soil pit (not illustrated) with the bucket 33, slewing (lift slewing) the upper slewing body 22 toward a dump truck (not illustrated) while holding the soil, removing (soil removal) soil to a loading platform (not illustrated) of the dump truck, and slewing (return slewing) the upper slewing body 22 toward the soil pit.

A series of motions by automatic drive has a plurality of motion phases (motion content). As described above, in a series of motions from soil excavation to soil removal, the plurality of motion phases include excavation, lift slewing, soil removal, and return slewing.

While automatic drive is performed in each of the plurality of work machines 20, the operator in the management room 1 can remotely control the other work machines 20 by operating the operation device 8. At this time, the management room side control unit 7 causes the remote control display device 4 to display an image captured by the camera 55 mounted on the work machine 20 to be remotely controlled. The operator in the management room 1 can suitably control the work machine 20 to be remotely controlled while viewing the remote control display device 4.

While automatic drive is performed in each of the plurality of work machines 20, the management room side communication device (reception device) 9 receives information (signal) regarding the motion situation from each of the work machines 20. Here, the motion situation includes a plurality of items. The plurality of items include current work content, a motion phase, and a work progress situation (remaining number of times and the like).

The management room side communication device 9 receives information regarding the motion situation also from the work machine 20 remotely controlled by the operator in the management room L. Note that the management room side communication device 9 may receive information regarding the motion situation from the work machine 20 controlled by an operator, on board in the cab 23, different from the operator in the management room 1, the work machine 20 remotely controlled by an operator different from the operator in the management room 1 from another management room 1, or the like.

Here, from detection values of the slewing angle sensor 52 and the work posture detector 60, the work machine side control unit 11 determines as to which of excavation, lift slewing, soil removal, and return slewing the motion phase is. Note that the work machine side control unit 11 may determine the motion phase from operation pressure of the work drive device 40.

By inputting, to the display device 3, a command signal corresponding to an image indicating the motion situation of each of the plurality of work machines 20, the management room side control unit (display control unit) 7 displays the image on the display device 3. This enables the operator in the management room 1 to grasp the motion situation of each of the plurality of work machines 20. Note that also in subsequent image display, similarly to the above, the image is displayed by inputting, to each display device, a command signal corresponding to a display image from each control unit.

Figure 4:
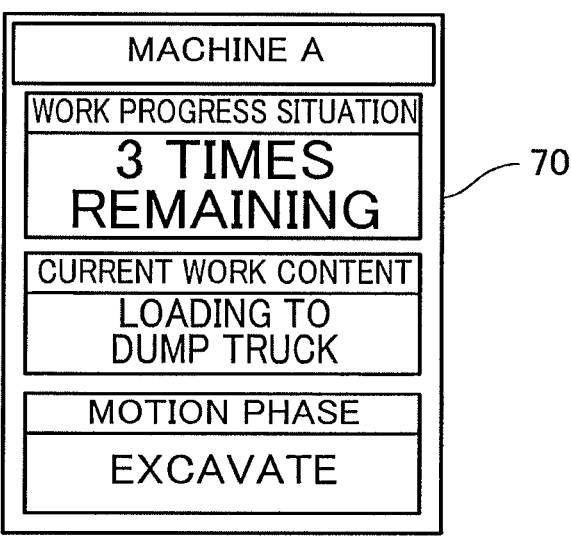
FIG. 4 is a view illustrating an example of a display image displaying a motion situation of a work machine being automatically driven.
Figure 5:
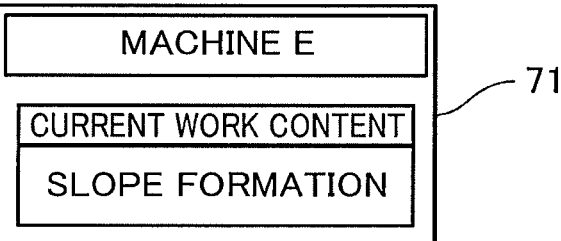
FIG. 5 is a view illustrating an example of a display image displaying a motion situation of a work machine being remotely controlled.

Here, the management room side control unit 7 changes the item of the motion situation to be displayed on the display device 3 in accordance with whether or not the work machine 20 is being automatically driven. FIGS. 4 and 5 are views illustrating a display image 70. When the work machine 20 is being automatically driven, as illustrated in FIG. 4, the management room side control unit 7 displays, on the display device 3, the display image 70 displaying each of the current work content, the motion phase, and the work progress situation. On the other hand, when the work machine 20 is not being automatically driven (when remotely controlled), the management room side control unit 7 displays, on the display device 3, a display image 71 displaying only the current work content as illustrated in FIG. 5. The display images 70 and 71 illustrated in FIGS. 4 and 5 are displayed on the display device 3 for each of the plurality of work machines 20.

Since the operator in the management room 1 performs remote control by himself, he can grasp the motion phase of the work machine 20 being remotely controlled and the progress situation of the work even if the information is not displayed on the display device 3. Therefore, for the work machine 20 not being automatically driven (being remotely controlled), by decreasing the number of items displayed on the display device 3 as compared with the work machine 20 being automatically driven, it is possible to cause the operator to visually recognize information excluding unnecessary information. On the other hand, for the work machine 20 being automatically driven, by increasing the number of items displayed on the display device 3 as compared with the work machine 20 not being automatically driven, it is possible to cause the operator to grasp the motion situation of the work machine 20 being automatically driven in detail.

In particular, in the present embodiment, when the work machine 20 is being automatically driven, the motion phase of the work machine 20 is displayed on the display device 3, and therefore, the operator can grasp whether or not the work machine 20 being automatically driven normally moves by recognizing whether or not the motion phase is normally switched.

Returning to FIG. 3, the management room side control unit (abnormality detection unit) 7 detects a motion abnormality of the work machine 20 being automatically driven. For example, when the motion phase is not switched for a certain period of time (e.g., 10 seconds), the management room side control unit 7 determines that the work machine 20 being automatically driven is stopped as an example of the motion abnormality. When the work progress situation (remaining number of times and the like) does not change for a certain period of time (e.g., 10 seconds), the management room side control unit 7 determines that the work machine 20 being automatically driven is stopped as an example of the motion abnormality.

Figure 6:
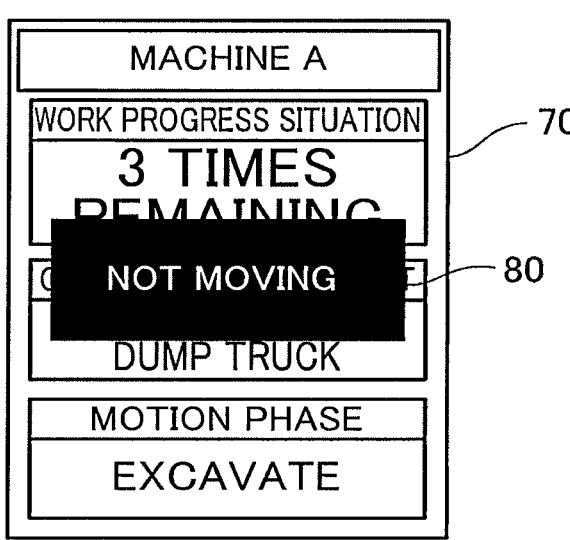
FIG. 6 is a view illustrating an example of a display image displaying a motion situation of a work machine, and is a view illustrating a state in which a warning image is superimposed and displayed.

When detecting a motion abnormality, the management room side control unit (abnormality notification unit) 7 notifies the detection result. Specifically, the management room side control unit 7 displays, on the display device 3, the detection result of the motion abnormality or emits a sound from a speaker provided in the management room 1. FIG. 6 is a view illustrating the display image 70. As illustrated in FIG. 6, the management room side control unit 7 superimposes and displays a warning image 80 onto the display image 70. Note that the management room side control unit 7 may display the display image 70 surrounded with a frame in red or the like, or may use a different background color of a corresponding part (motion phase, progress situation of work, or the like) of the display image 70.

As a result, by viewing the display device 3, the operator can grasp an abnormality having occurred in the motion of the work machine 20 being automatically driven. Therefore, by switching the work machine 20 to remote operation, the operator can solve the abnormality by himself.

For example, when an abnormality occurs in the motion of the work machine 20 being automatically driven, the operator having viewed the display device 3 and recognized the abnormality first safely stops the work machine 20 remotely controlled by the operator himself. Then, the operator switches from the work machine 20 in which the remote control target is stopped to the work machine 20 in which the abnormality has occurred. Then, by remotely controlling the work machine 20 in which the abnormality has occurred, the operator can solve the abnormality.

Note that when an abnormality occurs in the motion of the work machine 20 being automatically driven, the management room side control unit 7 may switch the image displayed on the remote control display device 4 in FIG. 2 from the image captured by the camera 55 of the work machine 20 to be remotely controlled to the image captured by the camera 55 of the work machine 20 in which the abnormality has occurred. As an example, the remote control display device 4 has an image region larger than that of the display device 3, and therefore an image captured by the camera 55 of the work machine 20 in which an abnormality has occurred is displayed on the remote control display device 4, whereby the operator can grasp details of the abnormality content.

The motion situation received by the management room side communication device 9 includes an actual trajectory of the tip end of the bucket 33. The management room side control unit 7 acquires the target trajectory of the tip end of the bucket 33 stored in advance by the storage device 13 of the work machine 20 via the management room side communication device 9. Then, the management room side control unit 7 superimposes and displays, on the display device 3, the target trajectory of the tip end of the bucket 33 and the actual trajectory of the tip end of the bucket 33.

Figure 7:
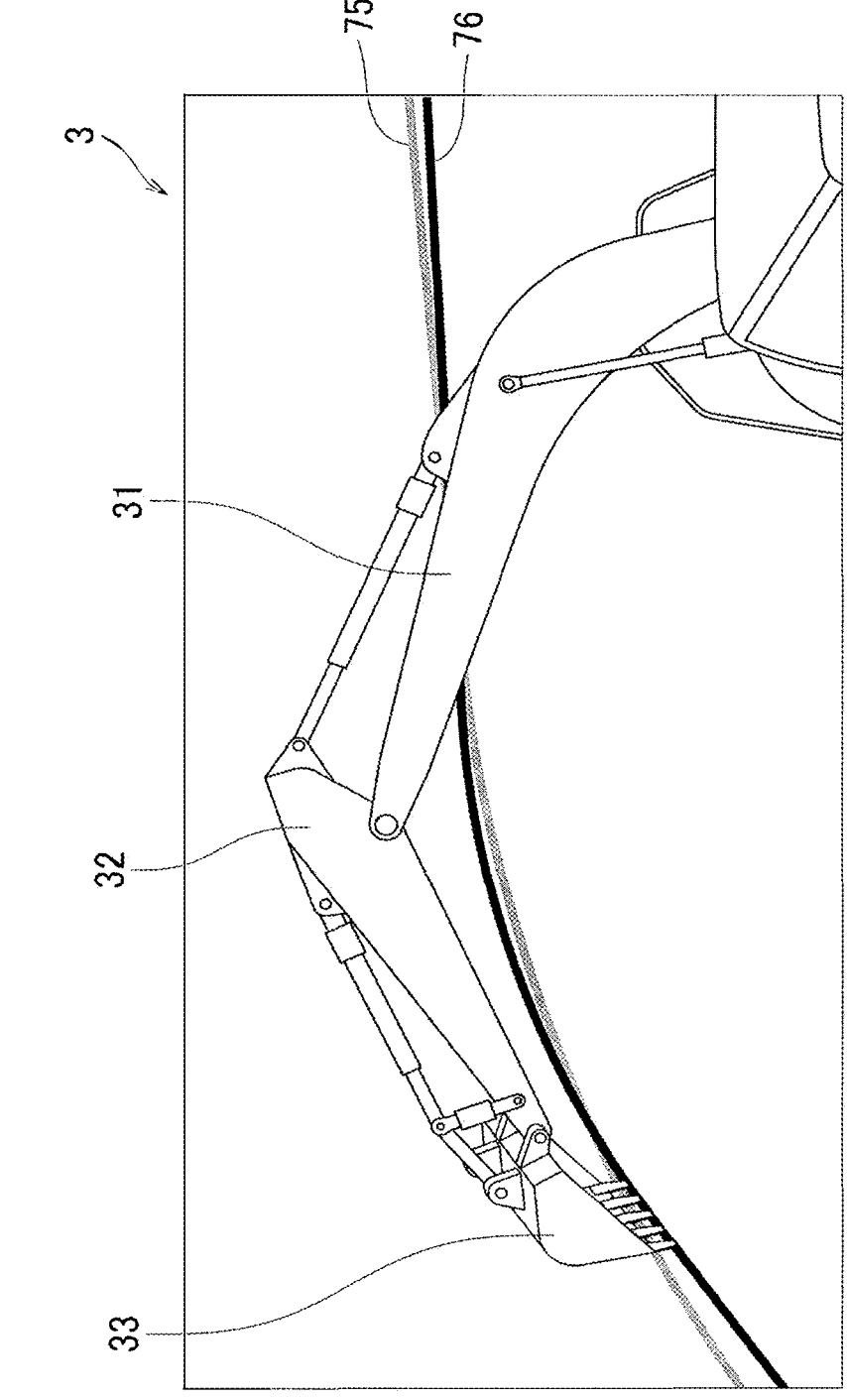
FIG. 7 is a view illustrating a scene in which a target trajectory of a tip end of a bucket and an actual trajectory of the tip end of the bucket are superimposed and displayed on the display device.

FIG. 7 illustrates a screen on which a target trajectory 75 of the tip end of the bucket 33 and an actual trajectory 76 of the tip end of the bucket 33 that are superimposed and displayed on, for example, the display device 3 or the remote control display device 4. The operator can grasp whether or not an abnormality has occurred in the motion of the work machine 20 by comparing the target trajectory 75 with the actual trajectory 76. When the work machine 20 in which the abnormality has occurred is being automatically driven, the abnormality can be solved by switching this work machine 20 to remote operation or the like.

Returning to FIG. 3, the management room side control unit (stop detection unit) 7 detects motion stop of the work machine 20 being automatically driven. The work machine side control unit 11 of the work machine 20 being automatically driven stops the motion of the work machine 20 when a predetermined end condition is established. This information is transmitted to the management room side control unit 7 of the management room 1, whereby the motion stop of the work machine 20 being automatically driven is detected.

Figure 8:
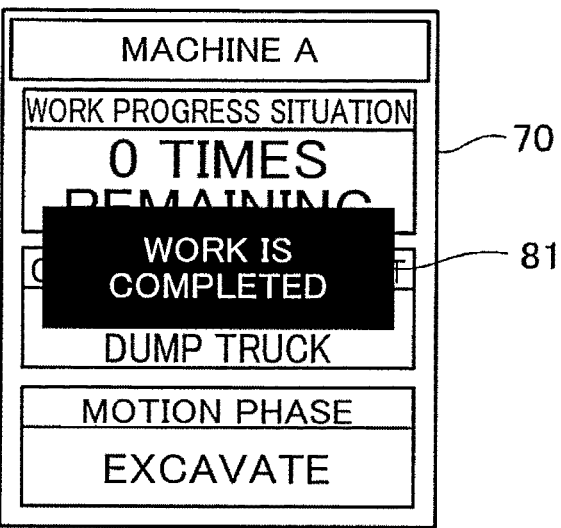
FIG. 8 is a view illustrating an example of a display image displaying a motion situation of a work machine, and is a view illustrating a state in which a notification image for notifying of motion stop of the work machine is superimposed and displayed.

FIG. 8 is a view illustrating the display image 70. As illustrated in FIG. 8, when the remaining number of times, which is a progress situation of work, becomes "0", the work machine side control unit 11 stops the motion of the work machine 20 being automatically driven. Note that when a designated work time has elapsed or when excavation of a designated amount of soil is finished, the work machine side control unit 11 may stop the motion of the work machine 20 being automatically driven. Note that the total amount of excavated soil may be calculated by capturing an image of the soil in the bucket 33 with the camera 55, predicting the amount of soil excavated by the bucket 33, and accumulating the amount, or may be calculated from a change amount (decrease amount) from the time of work start of the soil amount inside the soil pit captured by the camera 55.

When the inside of the soil pit is captured by LiDAR or the like and it is detected that the excavation target soil no longer exists, the work machine side control unit 11 may stop the motion of the work machine 20 being automatically driven. The work machine side control unit 11 may capture an image of the inside of the soil pit with the camera 55 or the like, and stop the motion of the work machine 20 being automatically driven when the soil accumulates at a position (position not included in teaching) where excavation cannot be performed by automatic drive. The work machine side control unit 11 may capture an image of a soil removal location with the camera 55 or the like, and stop the motion of the work machine 20 being automatically driven when the soil accumulates to a height at which the soil can no longer discharged.

When detecting the motion stop of the work machine 20 being automatically driven, the management room side control unit (stop notification unit) 7 notifies the detection result. Specifically, the management room side control unit 7 displays, on the display device 3, the detection result of the motion stop or emits a sound from the speaker provided in the management room 1. In the present embodiment, as illustrated in FIG. 8, the management room side control unit 7 superimposes and displays a notification image 81 on the display image 70. Note that the management room side control unit 7 may display the display image 70 surrounded with a frame in red or the like, or may use a different background color of a corresponding part (progress situation of work or the like) of the display image 70.

By viewing the display device 3, the operator can grasp the motion of the work machine 20 being automatically driven having been stopped. Therefore, it is possible to resume the motion of the work machine 20 by switching to the remote operation. As a result, idle time of the work machine 20 being automatically driven can be shortened as compared with the case where the motion stop of the work machine 20 being automatically driven is not notified.

Note that when detecting the motion stop of the work machine 20 being automatically driven, the management room side control unit 7 may switch the image displayed on the remote control display device 4 of FIG. 2 from the image captured by the camera 55 of the work machine 20 to be remotely controlled to the image captured by the camera 55 of the work machine 20 whose motion has been stopped. Also in this case, the image captured by the camera 55 of the work machine 20 whose motion has been stopped is displayed on the remote control display device 4, whereby the operator can grasp the work situation in detail at the time of motion stop.

When resuming the motion of the work machine 20 being automatically driven, the operator supports the resumption of the motion by remotely operating this work machine 20. Specifically, the operator shapes the soil for easy excavation, moves the soil to a position where excavation is easy, and levels the soil at the soil removal location. The operator causes the work machine 20 to travel to a position where work is easy. Note that also in this case, it is desirable for the operator to first safely stop the work machine 20 remotely controlled by the operator himself before supporting the resumption of the motion.

Here, when the motion stop of another work machine 20 being automatically driven is notified at a timing when the operator is performing some motion of one work machine 20 by remote control, there is a risk of troubling the remote control by the operator because the operator is surprised or the concentration of the operator on the operation is disturbed. Therefore, at the timing when the motion of the work machine 20 remotely controlled by the operation device 8 is interrupted, the management room side control unit 7 notifies the detection result of the motion stop. This can suppress a trouble from occurring in the remote control by the operator.

Here, the timing at which the motion of the work machine 20 remotely controlled is interrupted is a timing at which the operation lever becomes neutral, a timing at which lock of the operation lever is on, a timing at which the work machine 20 is in an idling state, or the like.

After the motion of the work machine 20 being automatically driven is stopped and when the operator is notified of that effect, the idle time until the motion of the work machine 20 is resumed becomes long, and there is a possibility that the work efficiency deteriorates.

Therefore, the management mom side control unit (pre-stop state detection unit) 7 may detect that the work machine 20 being automatically driven is in a state of stopping the motion soon, not after the motion stop. In this case, when the predetermined end condition is established soon, the work machine side control unit 11 of the work machine 20 being automatically driven transmits the information to the management room side control unit 7 of the management room 1. This enables the management room side control unit 7 to detect that the work machine 20 being automatically driven is in a state of stopping the motion soon.

Figure 9:
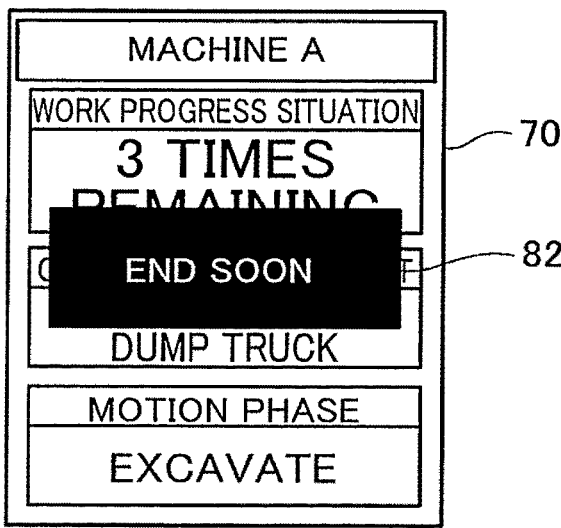
FIG. 9 is a view illustrating an example of a display image displaying a motion situation of a work machine, and is a view illustrating a state in which a notification image for notifying that the work machine is in a state of stopping motion soon is superimposed and displayed.

FIG. 9 is a view illustrating the display image 70. As illustrated in FIG. 9, when the remaining number of times, which is the progress situation of work, becomes, for example, "3", the work machine side control unit 11 determines that the work machine 20 being automatically driven is in a state of stopping motion soon, and notifies the management room side control unit 7 of the management room 1 of the information. Note that when the designated work time has the remaining 1 minute, for example, or when 95%, for example, of the designated amount of soil has been excavated, the work machine side control unit 11 may determine that the work machine 20 being automatically driven is in a state of stopping the motion soon and notify the management room side control unit 7 of the management room 1 of the information.

When capturing the inside of the soil pit by LiDAR or the like and detecting that the excavation target soil no longer exists soon, the work machine side control unit 11 may determine that the work machine 20 being automatically driven is in a state of stopping the motion soon and notify the management room side control unit 7 of the management room 1 of the information. When the soil removal location is captured with the camera 55 or the like, and the soil accumulates to, for example, 90% of the height at which soil can be no longer removed, the work machine side control unit 11 may determine that the work machine 20 being automatically driven is in a state of stopping the motion soon and notify the management room side control unit 7 of the management room 1 of the information.

When detecting that the work machine 20 being automatically driven is in a state of stopping motion soon, the management room side control unit (pre-stop notification unit) 7 notifies the detection result. Specifically, the management room side control unit 7 displays, on the display device 3, a detection result indicating that the work machine 20 being automatically driven is in a state of stopping motion soon or emits a sound from the speaker provided in the management room 1. In the present embodiment, as illustrated in FIG. 9, the management room side control unit 7 superimposes and displays a notification image 82 on the display image 70. Note that the management room side control unit 7 may display the display image 70 surrounded with a frame in red or the like, or may use a different background color of a corresponding part (progress situation of work or the like) of the display image 70.

By viewing the display device 3, the operator can grasp that the motion of the work machine 20 being automatically driven is stopped soon. Therefore, it is possible to perform, in advance, preparation for remote control of this work machine 20 so that the motion can be resumed soon after this work machine 20 stops the motion. As a result, it is possible to shorten the idle time of the work machine 20 being automatically driven as compared with a case where it is not notified that the work machine 20 being automatically driven is in a state of stopping motion soon.

Note that when detecting that the work machine 20 being automatically driven is in a state of stopping motion soon, the management room side control unit 7 may switch the image displayed on the remote control display device 4 from the image captured by the camera 55 of the work machine 20 being remotely controlled to the image captured by the camera 55 of the work machine 20 in the state of stopping motion soon. The image captured by the camera 55 of the work machine 20 in the state of stopping motion soon is displayed on the remote control display device 4, whereby the operator can grasp the work situation in detail in a state where the motion is stopped soon.

Here, when it is notified that another work machine 20 being automatically driven is in a state of stopping the motion soon at a timing when the operator is performing some motion of one work machine 20 by remote control, there is a risk of troubling the remote control by the operator because the operator is surprised or the concentration of the operator on the operation is disturbed. Therefore, at the timing when the motion of the work machine 20 remotely controlled by the operation device 8 is interrupted, the management room side control unit 7 notifies the detection result that the work machine 20 being automatically driven is in a state of stopping the motion soon. This can suppress a trouble from occurring in the remote control by the operator.

Modifications

In the above description, when an abnormality occurs in the motion of the work machine 20 being automatically driven, the management room side control unit 7 switches the remote control target to the work machine 20 in which the abnormality has occurred, and may switch the remote control target also in the following cases. For example, the work machine 20 that automatically performs a series of motions from excavation to soil removal waits for a dump truck while the dump truck to serve as a soil removal destination is absent. If the dump truck approaches when the work machine 20 being automatically driven is waiting for the dump truck, the work machine side control unit 11 having recognized the approaching dump truck from the image of the camera 55 transmits, to the management room 1, a signal indicating that the dump truck has arrived. Upon recognizing the signal, the operator in the management room 1 safely stops the work machine 20 remotely controlled by the operator himself, and switches the work machine 20 of the remote control target to the work machine 20 that has transmitted the signal. Then, by remotely controlling the work machine 20 that has transmitted the signal, the operator starts the automatic drive including soil removal to the dump truck having arrived.

In the above description, an aspect in which displaying the display images 70 and 71 on the display device 3 causes the operator to grasp the motion situation of each of the plurality of work machines 20 has been described as illustrated in FIGS. 4 and 5, but the management room side control unit 7 may display a map image on the display device 3, superimpose and display an icon indicating the work machine 20 on the map image, and display an image representing the motion situation in the vicinity of this icon. The icon indicating the work machine 20 is displayed in the position of the work machine 20 on the map image. The position of the work machine 20 may be acquired by mounting a GNSS or the like on the work machine 20.

In the present embodiment, an aspect in which the management system includes the work machine side control unit 11 and the management room side control unit 7 has been described as illustrated in FIG. 3, but the function executed by one of the control units may be executed by the other control unit.

As described above, according to the management system 100 according to the present embodiment, the motion situation of each of the plurality of work machines 20 is displayed on the display device 3. This enables the operator in the management room 1 to grasp the motion situation of each of the plurality of work machines 20. Therefore, after remotely teaching motion to each of the several work machines 20, the operator in the management room 1 can further remotely operate the other work machines 20 while these work machines 20 perform automatic drive. At this time, the operator in the management room 1 or the like can grasp the motion situation of the work machine 20 performing automatic drive.

In the present embodiment, the item to be displayed on the display device 3 is changed in accordance with whether or not the work machine 20 is being automatically driven. For example, in a case where the work machine 20 is automatically driven, the number of items to be displayed on the display device 3 is increased as compared with a case where the work machine 20 is not automatically driven, whereby it is possible to cause the operator to grasp the motion situation in detail of the work machine 20 being automatically driven. For example, when the work machine 20 is not automatically driven, in other words, when the operator remotely operates the work machine 20 by himself, the number of items to be displayed on the display device 3 is reduced as compared with a case where the work machine 20 is being automatically driven, whereby it is possible to cause the operator to grasp information excluding unnecessary information.

In the present embodiment, when the work machine 20 is being automatically driven, the motion phase (motion content) of the work machine 20 is displayed on the display device 3. For example, when the work machine 20 being automatically driven performs a series of motions from excavation to soil removal, the operator can grasp whether or not the work machine 20 being automatically driven is normally moving by recognizing whether or not the motion phase is normally switched based on the display of the display device 3.

In the present embodiment, when a motion abnormality of the work machine 20 being automatically driven is detected, the detection result is notified. This enables the operator to grasp an abnormality having occurred in the motion of the work machine 20 being automatically driven. Therefore, it is possible to solve the abnormality by remotely operating this work machine 20.

When the motion stop of the work machine 20 being automatically driven is detected, the detection result is notified. This enables the operator to grasp the motion of the work machine 20 being automatically driven having been stopped. Therefore, the motion can be resumed by remotely operating this work machine 20. As a result, idle time of the work machine 20 being automatically driven can be shortened as compared with the case where the motion stop of the work machine 20 being automatically driven is not notified.

In the present embodiment, at the timing when the motion of the work machine 20 remotely controlled by the operation device 8 is interrupted, the motion stop of the work machine 20 being automatically driven is notified. When the motion stop of the work machine 20 being automatically driven is notified at a timing when the operator is performing some motion of the work machine 20 by remote control, there is a risk of troubling the remote control by the operator because the operator is surprised or the concentration of the operator on the operation is disturbed. Therefore, at the timing when the motion of the work machine 20 being remotely controlled is interrupted, the motion stop of the work machine 20 being automatically driven is notified, whereby it is possible to suppress a trouble from occurring in the remote control by the operator.

When detecting that the work machine 20 being automatically driven is in a state of stopping motion soon, the detection result is notified. This enables the operator to grasp the motion of the work machine 20 being automatically driven stopping soon. Therefore, it is possible to perform, in advance, preparation for remote control of this work machine 20 so that the motion can be resumed soon after this work machine 20 stops the motion. As a result, it is possible to shorten the idle time of the work machine 20 being automatically driven as compared with a case where it is not notified that the work machine 20 being automatically driven is in a state of stopping motion soon.

At the timing when the motion of the work machine 20 remotely controlled by the operation device 8 is interrupted, it is notified that the work machine 20 being automatically driven is in a state of stopping the motion soon. When it is notified that the work machine 20 being automatically driven is in a state of stopping the motion soon at a timing when the operator is performing some motion of the work machine 20 by remote control, there is a risk of troubling the remote control by the operator because the operator is surprised or the concentration of the operator on the operation is disturbed. Therefore, at the timing when the motion of the work machine 20 remotely controlled is interrupted, it is notified that the work machine 20 being automatically driven is in a state of stopping the motion soon, whereby it is possible to suppress a trouble from occurring in the remote control by the operator.

In the present embodiment, the target trajectory 75 of the tip end of the bucket 33 and the actual trajectory 76 of the tip end of the bucket 33 are superimposed and displayed on the display device 3. This enables the operator to grasp whether or not an abnormality has occurred in the motion of the work machine 20 by comparing the target trajectory 75 with the actual trajectory 76. When the work machine 20 in which the abnormality has occurred is being automatically driven, the abnormality can be solved by switching this work machine 20 to remote operation or the like.

An image captured by the camera 55 mounted on the work machine 20 to be remotely controlled is displayed on the remote control display device 4. The operator in the management room 1 can suitably control the work machine 20 to be remotely controlled while viewing the remote control display device 4.

Although the embodiment of the present invention has been described above, only specific example has been described, and the present invention is not particularly limited to the embodiment, and a specific configuration and the like can be modified in design as appropriate. The actions and effects described in the embodiment of the invention merely recite the most suitable actions and effects resulting from the present invention, and the actions and effects according to the present invention are not limited to those described in the embodiment of the present invention.

The present invention provides a management system. The management system includes a reception device that receives information regarding a motion situation of each of a plurality of work machines, a display device that displays an image according to a command signal to be input, and a display control unit that inputs, to the display device, the command signal corresponding to the motion situation of each of the plurality of work machines based on the information received by the reception device.

In the above configuration, the motion situation may include a plurality of items, and the display control unit may change the item to be displayed on the display device according to whether or not the work machine is automatically driven.

In the above configuration, the motion situation may include motion content of the work machine, and the display control unit may display the motion content on the display device when the work machine is being automatically driven.

The above configuration may further include an abnormality detection unit that detects a motion abnormality of the work machine being automatically driven among the plurality of work machines, and an abnormality notification unit that notifies a detection result of the abnormality detection unit when the abnormality detection unit detects the motion abnormality of the work machine.

The above configuration may further include a stop detection unit that detects a motion stop of the work machine being automatically driven among the plurality of work machines, and a stop notification unit that notifies a detection result of the stop detection unit when the stop detection unit detects the motion stop of the work machine.

The above configuration may further include an operation device that receives an input of an operation for remotely controlling at least one work machine among the plurality of work machines, and the stop notification unit may notify a detection result of the stop detection unit at a timing when a motion of the at least one work machine remotely controlled by the operation device is interrupted.

The above configuration may further include a pre-stop state detection unit that detects that the work machine being automatically driven among the plurality of work machines is in a state of stopping motion soon, and a pre-stop notification unit that notifies a detection result of the pre-stop state detection unit when the pre-stop state detection unit detects that the work machine is in a state of stopping motion soon.

The above configuration may further include an operation device that receives an input of an operation for remotely controlling at least one work machine among the plurality of work machines, and the pre-stop notification unit may notify a detection result of the pre-stop state detection unit at a timing when a motion of the at least one work machine remotely controlled by the operation device is interrupted.

In the above configuration, the work machine may include a lower travelling body, an upper slewing body slewably attached on the lower travelling body, and an attachment rotatably attached to the upper slewing body, a target trajectory setting unit that sets a target trajectory of a specific site of the attachment is further included, the motion situation includes an actual trajectory of the specific site, and the display control unit superimposes and displays, on the display device, a target trajectory of the specific site and an actual trajectory of the specific site.

The above configuration may further include an operation device that receives an input of an operation for remotely controlling at least one work machine among the plurality of work machines, and a remote control display unit that displays an image captured by an image capturing device mounted on the work machine remotely controlled by the operation device.

According to the present invention, the motion situation of each of the plurality of work machines is displayed on the display device. This enables the operator of the management system to grasp the motion situation of each of the plurality of work machines.

The invention claimed is:

1. A management system comprising:

a reception device that receives information regarding a motion situation of each of a plurality of work machines;

a display device that displays an image according to a command signal to be input; and a display control unit that inputs, to the display device, the command signal corresponding to the motion situation of each of the plurality of work machines based on the information received by the reception device, wherein the motion situation includes a current work content, a motion content, and a work progress situation, the display control unit displays, on the display device, the current work content, the motion content, and the work progress situation of the work machine being automatically driven among the plurality of work machines, and displays only the current work content among the current work content, the motion content, and the work progress situation of the work machine being remotely controlled among the plurality of work machines, such that motions of several of the plurality of work machines are automatically driven, and other work machines among the plurality of work machines are remotely operated, the management system further comprising a work machine control unit configured to control the work machine being automatically driven based on the motion content of the work machine being automatically driven.

2. The management system according to claim 1, wherein the display control unit changes the motion situation to be displayed on the display device in accordance with whether or not the work machine is being automatically driven.

3. The management system according to claim 1, further comprising:

an abnormality detection unit that detects a motion abnormality of the work machine being automatically driven among the plurality of work machines; and an abnormality notification unit that notifies a detection result of the abnormality detection unit when the abnormality detection unit detects the motion abnormality of the work machine.

4. The management system according to claim 1, further comprising:

a stop detection unit that detects a motion stop of the work machine being automatically driven among the plurality of work machines; and a stop notification unit that notifies a detection result of the stop detection unit when the stop detection unit detects the motion stop of the work machine.

5. The management system according to claim 4, further comprising an operation device that receives an input of an operation for remotely controlling at least one work machine among the plurality of work machines, wherein the stop notification unit notifies a detection result of the stop detection unit at a timing when a motion of the at least one work machine remotely controlled by the operation device is interrupted.

6. The management system according to claim 1, further comprising:

a pre-stop state detection unit that detects that the work machine being automatically driven among the plurality of work machines is in a state of stopping motion soon; and a pre-stop notification unit that notifies a detection result of the pre-stop state detection unit when the pre-stop state detection unit detects that the work machine is in a state of stopping motion soon.

7. The management system according to claim 6, further comprising an operation device that receives an input of an operation for remotely controlling at least one work machine among the plurality of work machines, wherein the pre-stop notification unit notifies a detection result of the pre-stop state detection unit at a timing when a motion of the at least one work machine remotely controlled by the operation device is interrupted.

8. The management system according to claim 1, wherein the work machine includes a lower travelling body, an upper slewing body slewably attached on the lower travelling body, and an attachment rotatably attached to the upper slewing body, a target trajectory setting unit that sets a target trajectory of a specific site of the attachment is further included, the motion situation includes an actual trajectory of the specific site, and the display control unit superimposes and displays, on the display device, a target trajectory of the specific site and an actual trajectory of the specific site.

9. The management system according to claim 1, further comprising:

an operation device that receives an input of an operation for remotely controlling at least one work machine among the plurality of work machines; and a remote control display unit that displays an image captured by an image capturing device mounted on the work machine remotely controlled by the operation device.

* * * * *